United States Patent [19]

Bolger

[11] Patent Number: 4,635,102
[45] Date of Patent: Jan. 6, 1987

[54] CHROMA SIGNAL AMPLITUDE CONTROL APPARATUS

[75] Inventor: Thomas V. Bolger, Merchantville, N.J.

[73] Assignee: RCA Corporation, Princeton, N.J.

[21] Appl. No.: 664,332

[22] Filed: Oct. 24, 1984

[51] Int. Cl.$^4$ .............................................. H04N 9/68
[52] U.S. Cl. ................................................ 358/27
[58] Field of Search ........................................ 358/27

[56] References Cited

U.S. PATENT DOCUMENTS

| | | | |
|---|---|---|---|
| 3,764,734 | 10/1973 | Srivastava et al. | 358/27 |
| 3,943,560 | 3/1976 | Freestone | 358/27 |
| 3,967,313 | 6/1976 | Miyamoto | 358/27 |
| 4,106,054 | 8/1978 | Tzakis | 358/27 |
| 4,106,055 | 8/1978 | Burdick et al. | 358/27 |
| 4,183,047 | 1/1980 | Kim et al. | 358/27 |
| 4,349,834 | 9/1982 | Tonomura et al. | 358/27 |
| 4,447,826 | 5/1984 | Lewis, Jr. et al. | 358/27 |
| 4,523,223 | 6/1985 | Luder et al. | 358/27 |

FOREIGN PATENT DOCUMENTS 2079092 1/1982 United Kingdom ................ 358/27

Primary Examiner—John W. Shepperd
Attorney, Agent, or Firm—E. M. Whitacre; P. J. Rasmussen; E. P. Herrmann

[57] ABSTRACT

A chroma overload system includes an up/down counter to develop a chroma gain/attenuation signal. Overload conditions are detected and responsive thereto pulses are generated to cause the counter to decrease chroma gain. In the absence of overload conditions, a pulse generator conditions the up/down counter to increase chroma gain to a predetermined limit. ACC is incorporated by monitoring burst and establishing the counting range and thereby the range of gain developed by the up/down counter.

14 Claims, 1 Drawing Figure

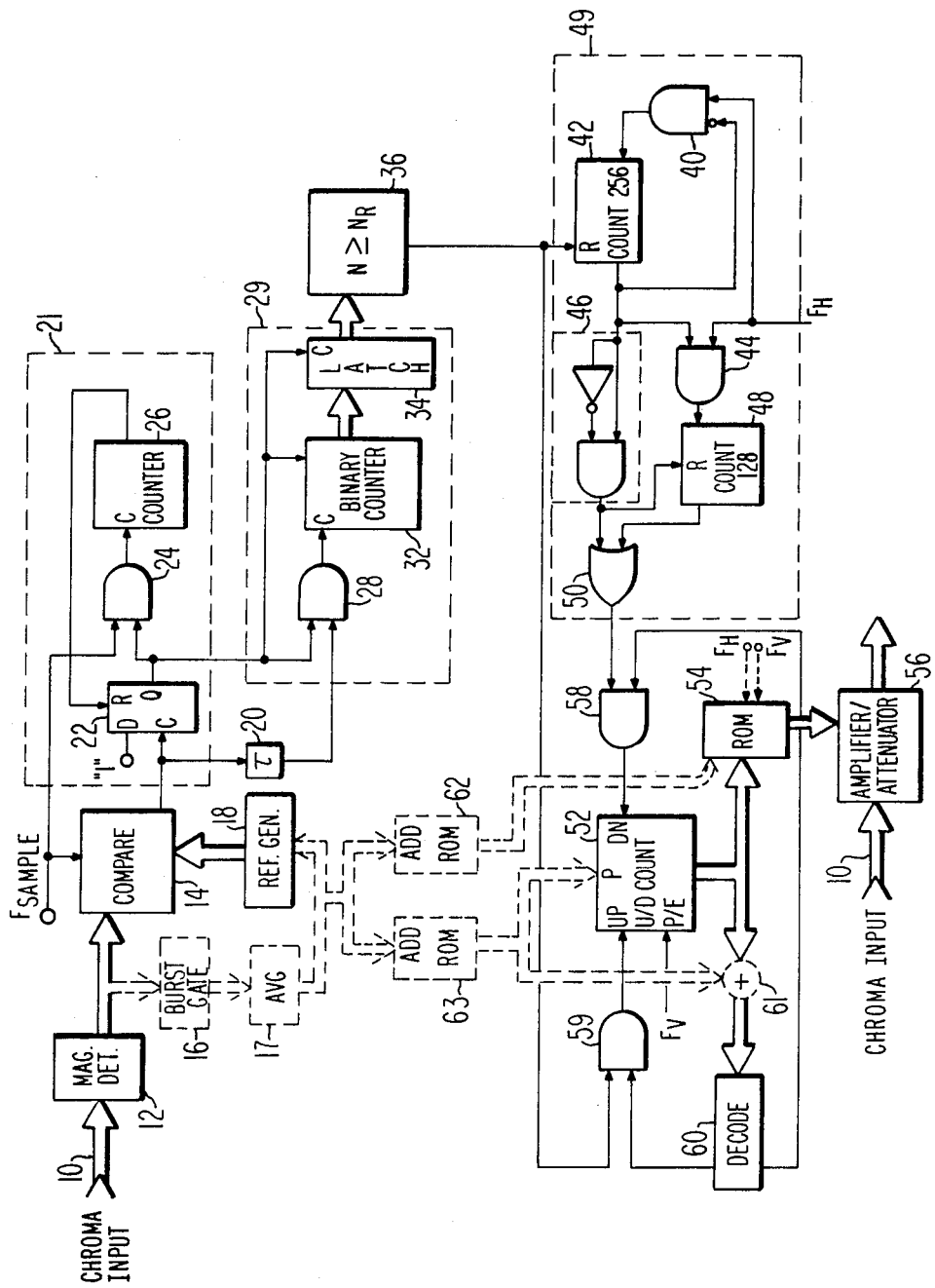

CHROMA SIGNAL AMPLITUDE CONTROL APPARATUS

This invention relates to apparatus for detecting the occurrence of chrominance signal exceeding a desired amplitude.

BACKGROUND OF THE INVENTION

The chrominance (chroma) component of conventional broadcast video signals include, in sequential format, a synchronizing color burst reference signal followed by color image information. The amplitude of the color burst and the ratio of the amplitude of the color burst to the amplitude of the image information are generally fixed by convention. Not infrequently, the magnitude of the color burst (and the image information) of the received signal deviates from the desired level due to faulty broadcast equipment or the transmission medium, etc. To compensate for these deviations and restore the chrominance signal to nominal levels, conventional receivers include automatic chrominance control (ACC) circuits. The ACC circuits compare the burst magnitude to a preset reference and amplify or attenuate the chrominance signal to maintain the burst signal amplitude constant at the desired level.

Due to faulty ACC operation or differential color burst-image information deviations, the ACC circuit may raise the chrominance signal magnitude undesirably high. The effect of this is to reproduce images with overly saturated colors. To compensate for this latter contingency, chroma overload circuitry is provided which monitors the chrominance signal after it has passed through the ACC circuitry, and attenuates the chrominance signal when its magnitude exceeds a predetermined amplitude.

The occurrence of chroma overloads, i.e. chroma signal exceeding a predetermined amplitude, normally correspond with portions of the chroma signal representing images with highly saturated color. In a field or a frame period, the percentage of chroma overload will be a function of the particular image displayed. If a chroma overload condition exists, only a small portion of a frame period may contain chroma signal exceeding the desirable amplitude (overload). However, the amplitude of the chroma signal over a greater portion of a field or frame period, while not exhibiting overload, may be proportionately larger than desired. In other words, whatever created the overload condition in the more highly saturated image portions of a frame period probably proportionately affects the entire chroma signal. Thus, for chroma overload correction, it is generally desirable to generate a correction signal which is applied to, e.g. a large portion or the entirety of the successive field or frame of chroma signal, and not to just the areas exhibiting overload conditions.

It has also been determined to be desirable to design chroma overload systems with faster attack times than decay times. The attack time is the time over which the chroma signal is attenuated in response to the detection of overload conditions. The decay time is the time over which chroma signal attenuation is reduced in the absence of overload conditions.

SUMMARY OF THE INVENTION

The present invention is a chroma overload detector including comparator circuitry for generating chroma overload control pulses. This circuitry develops a pulse each time the chroma signal amplitude exceeds a reference value for more than a predetermined percentage of a predetermined time interval. The control pulses are applied to a chroma gain determining element which produces a range of chroma gain signals. The overload control pulses decrement the chroma gain signals by a unit value per pulse until the lower limit of the range of chroma gain is reached.

A timing circuit responsive to a reference clock develops periodic pulses that are applied to the gain determining element in the absence of chroma overload conditions. The periodic pulses increment the chroma gain signal causing the gain determining element to slew to a nominal gain value.

In a further embodiment of the invention, automatic chroma control (ACC) is incorporated into the overload circuitry. The burst signal is gated into circuitry which determines the average burst amplitude. The average burst amplitude is coupled to the gain determining element to establish the nominal gain value thereof.

DETAILED DESCRIPTION

The present invention is applicable to processing either analog or digital chroma signals with appropriate choice of the circuit elements used to process the chroma signal.

The invention will be described with reference to the sole drawing in which broad arrows connecting circuit elements represent multiwire connections and narrow arrows represent single wire connections. In the drawing, the presumption is made that the chroma signal is in digital pulse code modulated (PCM) format. The PCM chroma samples occur in parallel bit binary codewords.

PCM chroma samples from e.g. a digital band-pass filter (not shown) are applied to a magnitude detector 12 via bus 10.

Magnitude detector 12 generates output samples representing the magnitude of the modulated chroma signal. Chroma magnitude samples from detector 12 are applied to a comparator 14 wherein they are compared with a reference value provided from a reference value generator 18. If the chroma magnitude sample exceeds the reference value, comparator 14 produces an output pulse.

Output pulses from comparator circuit 14 are applied to first and second counting circuits 21 and 29. Counting circuit 21 generates a timing interval by counting a predetermined number of chroma sample intervals. Counting circuit 29 counts the number of chroma overload occurrences in each timing interval.

The number of chroma overload occurrences N for each timing interval, produced by counting circuit 29 are applied to a comparator 36. Comparator 36 compares the number N with a predetermined reference number $N_R$. If the number N exceeds the reference number $N_R$, comparator 36 generates an output pulse.

Output pulses from comparator 36 are coupled to the up count input terminal (UP) of an up/down counter 52. Up/down counter 52 is arranged to count between e.g. 0 and 6 representing attenuation factors from 0 dB to 6 dB in 1 dB increments. Each pulse from comparator 36 increments the count by one unit until it reaches the maximum value of the counter.

A third counting circuit, 49, responsive to, for example, horizontal sync pulses $F_H$, and pulses produced by comparator 36, generates periodic pulses which are applied to the down clock input terminal, DN, of up/down counter 52. Counting circuit 49 is reset by each pulse produced by comparator 36 so that it is inhibited from producing a down clock pulse for e.g. one field period subsequent the lastmost pulse provided by comparator 36. Thereafter, circuit 49 generates down clock pulses at a rate commensurate with the desired decay time until it is inhibited by the next pulse from comparator 36.

Down clock pulses from counting circuit 49 decrement the count currently contained in up/down counter 52, by one unit for each down clock pulse. When the count in the up/down counter 52 reaches zero subsequent down clock pulses have no further affect on the count contained in counter 52.

The count value from counter 52 is applied to circuitry 54, which converts the count value to an appropriate attenuation or gain signal. Circuitry 54 may be a ROM look up table having an address input port coupled to the output of counter 52 and programmed to translate address values to gain or attenuation values. The attenuation/gain signal from circuit 54 is coupled to an attenuator/amplifier 56 for controlling the amplitude of the chroma signal.

In the figure up-clock and down-clock signals are coupled to up/down counter 52 via AND gates 59 and 58 respectively. AND gates 59 and 58 have respective second input terminals coupled to a decoder 60. Decoder 60, coupled to the output of counter 52, provides an enabling signal to AND gate 59 for output counts less than 6. When the count of 6 is reached AND gate 59 is disabled and no further up-clock pulses are coupled to counter 52 until the count in the counter is decreased below 6. Similarly, decoder 60 enables AND gate 58 to pass down-clock pulses only for the count in counter 52 being greater than zero. Thus, decoder 60 and AND gates 58 and 59 establish the range of values over which the counter 52 is active. (In this embodiment a direct connection is presumed between the output of counter 52 and decoder 60.)

Where circuit 56 is an attenuator, count values of 0-6 represent attenuation factors of 0 to (−) 6 db, i.e. signal attenuation of from 0 to ½ respectively. If there are no overload conditions detected, comparator 36 generates no pulses and counting circuit 49 decrements counter 52 to a count of zero which conditions attenuator, 56, to pass the chroma signal unaltered. Alternatively, if overload conditions are detected, the relative frequency of detected overload conditions determines the count value or up/down counter 52 and thereby the appropriate attenuation factor applied to circuit 56.

It may not be desirable to change the signal attenuation/gain during image display intervals. To preclude gain changes during active image periods, attenuation/gain changes may be constrained to occur only during either vertical or horizontal blanking intervals. This may be accomplished by applying vertical blanking signals $F_V$ or horizontal sync signals $F_H$ as enabling signals to circuit 54 to effectuate change of the gain values.

The foregoing description presumes that ACC circuitry precedes the chroma overload detector. In this instance the reference value is a fixed number corresponding to e.g. 88 IRE. Overload detection may, however, precede ACC circuitry. In this instance the reference values from reference generator 18 are made a function of burst amplitude.

The amplitude of the burst signal is generally indicative of the nominal maximum amplitude of the chroma signal. If burst is one-half its nominal velue, the maximum desirable amplitude of the chroma signal, is correspondingly one-half its nominal value. Alternatively, if burst is twice the nominal value so also is the maximum desirable amplitude of the chroma signal. The reference values produced by generator 18 must be varied to accommodate the changes in maximum chroma level relative to overload conditions.

The burst amplitude dependent reference value system includes burst gate 16, sample averager 17, and reference generator 18. Burst signal magnitude values are gated to the sample averager 17 by burst gate 16. The burst signal magnitude values are averaged over a predetermined number of lines or fields in averager 17. (Burst gate and sample averaging circuitry are known to those skilled in the art of video signal processing and will not be described in detail here).

Reference generator 18 may consist of a ROM. The averaged value of the burst signal magnitudes are applied to the address input port of the ROM. The ROM is programmed to translate the burst magnitudes to the appropriate reference values applied to comparator 14. For example, the reference values programmed into the ROM may be linearly dependent on the values applied to its address input port. For burst values and consequently address codewords corresponding to 20 IRE the ROM will produce a reference value corresponding to 88 IRE. For burst values corresponding to 10 and 30 IRE the ROM will be programmed to produce reference values of 44 and 132 IRE respectively, etc.

Now consider incorporating the ACC function into the chroma overload system. In the system described above, the up/down counter 52 and ROM 54, in the absence of overload conditions, slew to a nominal gain-/attenuation value of 1 (0 db). If the gain/attenuation value to which up/down counter 52 and ROM 54 slew is conditioned on the value of the burst signal, ACC may be accomplished in the overload system. For example, if the average value of burst ranges from 10 IRE to 30 IRE and the up/down counter 52 and ROM 54 are programmed responsive thereto to slew to gain values between 2(+6 db) and ½(−6 db) respectively, ACC will be effectuated over this range.

There are three ways in which the burst magnitudes may be applied to accomplish ACC. The first is to apply count values corresponding to the averaged burst magnitude values to the programming input port (P) of the up/down counter 52 to establish the range of values which the counter will produce. In the figure the averaged burst magnitude values are applied as address codewords to ROM 63 which is programmed to output a count value corresponding to the gain/attenuation required for each magnitude address codeword. The count value from ROM 63 is coupled to the P input port of up/down counter 52. This value is entered in counter 52 responsive to a vertical blanking pulse $F_V$ applied to the program/enable input terminal P/E of the counter. In addition, a count value from ROM 63 is applied to one input port of adder 61 to change the range of values decoded in decoder 60. Consider average burst magnitude values of 10 IRE, 20 IRE and 30 IRE. For these burst values up/down counter 52 and decoder 60 will be conditioned to count over the respective ranges of (−6 to 0), (0 to 6) and (−6 to −12) corresponding to gain/attenuation values of (+6 db to 0 db), (0 db to −6 db) and (−6 db to −12 db) respectively.

The second approach is to concatenate count values corresponding to gain values related to burst with the count from up/down counter 52 as composite address codewords applied to ROM 54. The averaged burst magnitude values from element 17 are applied as address codewords to ROM 62. ROM 62 is programmed to generate output values corresponding to the requisite gain required for the current averaged burst magnitude. If the count values from up/down counter 52 correspond to gain/attenuation factors in db then the gain values produced by ROM 62 will also correspond to db. The values from ROM 62 and the count from counter 52 are combined as the most significant and least significant bits respectively of address codewords applied to ROM 54. Responsive to the composite address, ROM 54 produces the desired gain/attenuation factor.

The third approach to incorporating ACC is a combination of the former two. Up/down counter 52 may be programmed for varied counts and the address codewords to ROM 54 may be augmented with values related to the burst magnitude. This latter approach may provide a more hardware efficient system depending on the resolution required of the gain/attenuation values.

Note that when ACC is incorporated with the chroma overload system, the reference values supplied by source 18 must be developed as a function of burst amplitude.

Counter circuits 21, 29 and 49 will now be described in more detail. Counter circuit 21 consists of latch 22, AND gate 24 and counter 26. The output terminal of comparator 14 is coupled to the clock input terminal of D-type latch 22. A pulse provided by comparator 14 places latch 22 in the set state. The set or Q output of latch 22 is coupled to one input terminal of AND gate 24. The second input terminal of AND gate 24 is coupled to a source of clock signals which is synchronous with the chroma sample rate. The output terminal of AND gate 24 is coupled to the clock input terminal of counter 26. Once a pulse from comparator 14 places latch 22 in the set state, AND gate 24 is enabled to pass the clock $F_{sample}$ to counter 26. When e.g. 32 $F_{sample}$ clock pulses are counted, counter 26 develops an output pulse which is coupled to reset latch 22. The signal produced on the set or Q output terminal of latch 22 will define a 32 $F_{sample}$ clock period interval. Once latch 22 is in the set state, additional pulses from comparator 14 have no affect on counter 21 until the latch is reset by counter 26.

Counting circuit 29 consists of AND gate 28, counter 32 and latch 34. The Q output from latch 22 of counting circuit 21 is coupled to latch 34 to condition it to store the contents of binary counter 32 at the end of a timing interval developed by circuit 21. The Q output from latch 22 is also coupled to reset binary counter 32 at the end of each timing interval and to one input terminal of AND gate 28. A logic high level from latch 22 enables AND gate 28 to pass pulses from comparator 14 to counter 32 during a timing interval. Binary counter 32 counts the number of pulses produced by comparator 14 for intervals of time established by counting circuit 21. This number is then stored in latch 34 until a subsequent interval and count is defined. Note a delay element, 20, is interposed between comparator 14 and counting circuit 29 to insure that the pulse that sets latch 22 is contained in the count for the respective interval.

Counting circuit 49 includes two counters 42 and 48. Counter 42 counts e.g. 256 clock pulses and then produces a logic "1" output. Counter 42 is reset to zero by each overload signal from comparator 36. A clock signal $F_H$ developed from e.g. the horizontal sync signal is coupled to the clock input of counter 42 through gate 40. A control input to gate 40 is coupled to the output terminal of counter 42 and passes clock signals $F_H$ to the counter 42 when the output of counter 42 is low. Thus, if counter 42 is not reset for 256 $F_H$ clock pulses, it generates a logic one output that disables gate 40 and no further $H_H$ clock pulses are applied to counter 42 until it is subsequently reset.

Positive going logic transitions from counter 42 are converted to respective pulses in circuit 46 and applied to AND gate 58 via OR gate 50. Timing circuit 49 produces no output pulses unless at least 256 $F_H$ clock pulses occur between successive overload signals from comparator 36.

The output terminal of counter 42 is applied to AND gate 44. A second input terminal of AND gate 44 is coupled to receive clock pulses $F_H$. After the output of counter 42 goes high, AND gate 44 is enabled to pass clock $F_H$ to the clock input terminal of counter 48. Counter 48 produces an output pulse for each e.g. 128 $F_H$ clock pulses. The pulses generated by counter 48 are coupled to AND gate 58 via OR gate 50. Counter 48 is inhibited by counter 42 being reset. Thus, counting circuit 49 produces an output pulse 256 $F_H$ clock periods after the lastmost overload signal and then produces an output pulse for each 128 clock pulses until the next occurrence of an overload signal.

What is claimed is:

1. A system for developing a chroma gain control signal for sampled data chroma signals including a burst component, comprising:
   means for applying said chroma signal;
   a source of reference signal;
   a source of reference value;
   means responsive to said chroma signal for developing an overload signal pulse when the number of chroma signal samples exceeding said reference value in a predetermined time interval exceeds a predetermined number;
   means responsive to said reference signal for developing periodic pulses in the absence of overload signal pulses for a predetermined period; and
   circuitry for developing a range of gain control signals having a first input terminal coupled to the means for developing overload signal pulses, a second input terminal coupled to said means for developing periodic pulses and an output port at which said chroma gain control signal is available, wherein pulses occurring at said first input terminal decrements the value of the gain control signal and pulses occurring at said second input terminal increments the gain control signal.

2. A chroma signal processing system comprising:
   means for applying chroma signal;
   means for applying a reference signal of predetermined frequency;
   a detector responsive to said chroma signal for detecting the magnitude thereof;
   a source of reference values;
   a comparator responsive to said reference values and said chroma signal magnitude for developing at an output terminal thereof, a pulse on each occurrence of the chroma signal magnitude exceeding said reference value;
   means coupled to said comparator for determining the number of said pulses occurring in predetermined time intervals and for developing an overload signal whenever the number counted over a predetermined interval exceeds a predetermined reference number;

means responsive to said reference signal and said means for developing the overload signal for generating pulses at predetermined intervals in the absence of overload signals;

means including a gain/attenuation determining element having first and second input terminals and an output port at which a gain/attenuation signal is available and wherein pulses applied to said first and second input terminals respectively increase and decrease the value of the gain/attenuation signal;

means for coupling said overload signal to one of said first and second input terminals; and means for coupling said pulses generated at predetermined intervals to the other of said first and second input terminals and wherein said gain/attenuation element slews toward a predetermined gain/attenuation signal value in the absence of overload signal.

3. The system set forth in claim 2 wherein said chroma signal includes a burst component and said means including a gain/attenuation determining element further includes:

means coupled to said detector for developing averaged values of the magnitudes of said burst component;

means responsive to the average burst magnitudes for developing a gain control signal proportional to the inverse ratio of said average burst magnitude value and a predetermined nominal burst magnitude; and means for coupling said gain control signal to said gain/attenuation determining element for establishing said predetermined gain/attenuation signal value.

4. The system set forth in claim 3 wherein said source of reference values comprises:

means responsive to the average values of the burst magnitudes for translating said values to reference values wherein a predetermined nominal average value of burst magnitude develops a nominal reference value and greater and lesser average values of burst magnitudes develop greater and lesser reference values respectively.

5. The system set forth in claim 2 wherein said chroma signal includes a burst component and said source of reference values comprises:

means coupled to said detector for developing averaged values of the magnitudes of said burst component;

means responsive to the average values of the burst magnitudes for translating said values to reference values wherein a predetermined nominal average value of burst magnitude develops a nominal reference value and greater and lesser average values of burst magnitudes develop greater and lesser reference values respectively.

6. The system set forth in claim 2 wherein the means including a gain determining element comprises:

an up/down counter having respective up-clock and down-clock input terminals and a count output port;

first and second gating means having respective output terminals coupled to said up-clock and down-clock input terminals, respective signal input terminals coupled to said first and second input terminals respectively and having respective control input terminals;

a decoder having an input port coupled to said count output port, having first and second output terminals coupled respectively to the control input terminals of said first and second gating means, said decoder being responsive to count output values to selectively enable said first and second gating means thereby determining the range of count values generated by said up/down counter.

7. The system set forth in claim 6 wherein the means including a gain determining element further includes a ROM coupled to the count output port for translating count values to a gain/attenuation value.

8. The system set forth in claim 2 wherein the means for generating pulses at predetermined intervals comprises:

counting circuitry for counting cycles of said reference signal to produce a first pulse a first predetermined number of cycles of said reference signal subsequent the lastmost occurrence of said overload signal and producing successive pulses separated by a second predetermined number of cycles of said reference signal and wherein the occurrence of said overload signal conditions said counting circuitry to reinitiate the counting sequence.

9. The system set forth in claim 8 wherein said first and second predetermined number of cycles of said reference signal are equal.

10. The system set forth in claim 2 wherein the means for developing said overload signal comprises:

a source of clock pulses;

a first counting circuit having an input terminal coupled to said comparator and responsive to a pulse produced thereby to count a predetermined number of said clock pulses and to produce an enabling signal for the duration of counting said predetermined number of clock pulses;

a second counting circuit having an input terminal coupled to the output terminal of said comparator, and responsive to said enabling signal for counting the number, N, of pulses produced by said comparator for the duration of said enabling signal; and means for comparing the number N of pulses counted against a predetermined reference number $N_R$ and producing said overload signals when the number N exceeds the number $N_R$.

11. The apparatus set forth in claim 10 wherein said chroma signal includes a burst component and said source of reference values comprises:

means coupled to said detector for determining average values of the magnitude of the burst component; and means responsive to the average values of the burst magnitude for translating such values to reference values wherein a predetermined nominal average value of burst magnitude develops a nominal reference value and greater and lesser average values of burst magnitudes develop greater and lesser reference values respectively.

12. A system for developing a chroma gain control signal for sampled data chroma signals including a burst component, comprising:

means for applying said chroma signal;

a source of reference signal;

means responsive to the burst component for developing reference values linearly related to the magnitude of the burst component;

means responsive to said chroma signal for developing overload signal pulses on the occurrence of the magnitude of said chroma signal exceeding said reference values a predetermined number of times in a predetermined time interval;

means responsive to said reference signal for developing periodic pulses in the absence of overload signal pulses for a predetermined period;

circuitry for developing a range of gain control signals having a first input terminal coupled to the means for developing overload signal pulses, a second input terminal coupled to said means for developing periodic pulses and an output port at which said chroma gain control signal is available, wherein pulses occurring at said first input terminal decrements the value of the gain control signal and pulses occurring at said second input terminal increments the gain control signal.

13. The system set forth in claim 12 further including:

means responsive to the burst component for developing sample values proportional to the ratio of a nominal magnitude of burst to a current value of burst magnitude; and means for coupling said sample values to said circuitry for developing a range of gain control signals to establish said range of gain control signals.

14. The system set forth in claim 12 further including:

means responsive to the burst component for developing sample values related to the ratio of a nominal burst magnitude to a current value of burst magnitude; and means for combining said sample values with signal available at the output port of said circuitry for developing a range of control signals to develop a composite gain control signal.

* * * * *